March 8, 1927.
W. C. PALMER
VELOCIMETER
Filed April 14, 1923  2 Sheets-Sheet 1
1,620,224
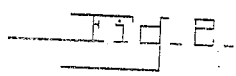
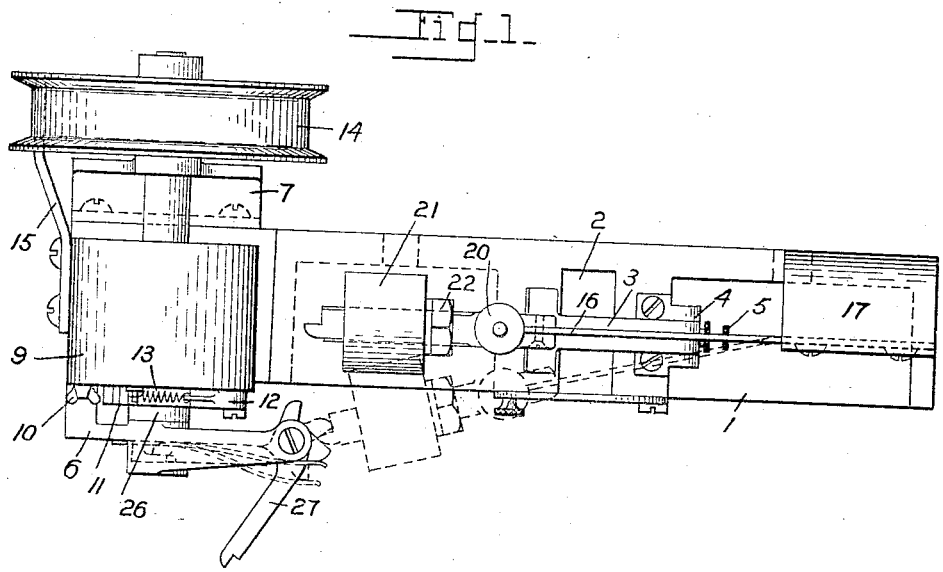
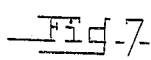
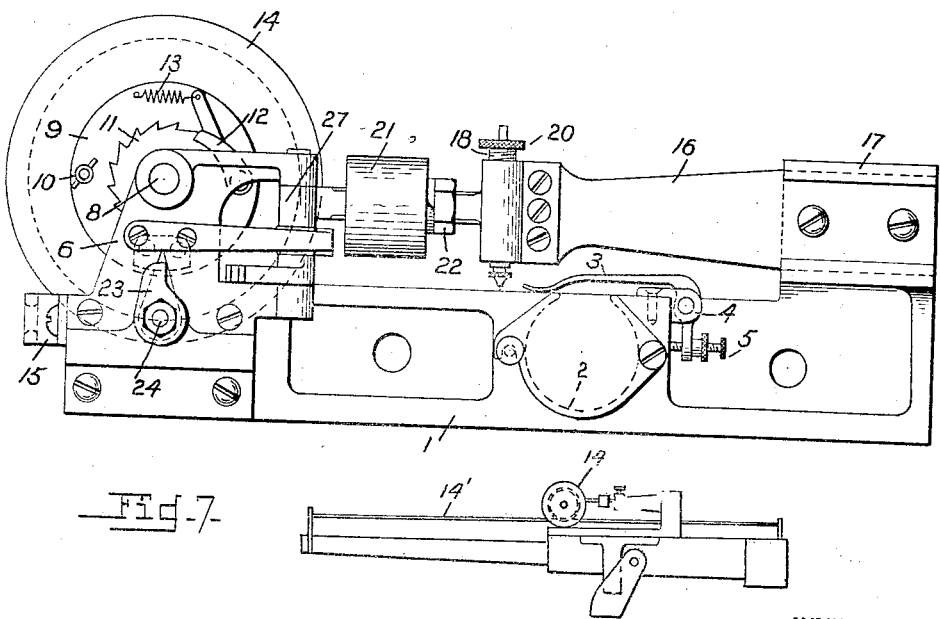
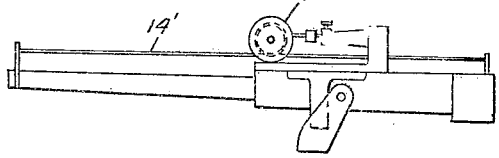
INVENTOR
W. C. Palmer
BY
W. N. Roach
ATTORNEY March 8, 1927.  
W. C. PALMER  
VELOCIMETER  
Filed April 14, 1923    2 Sheets-Sheet 2
1,620,224
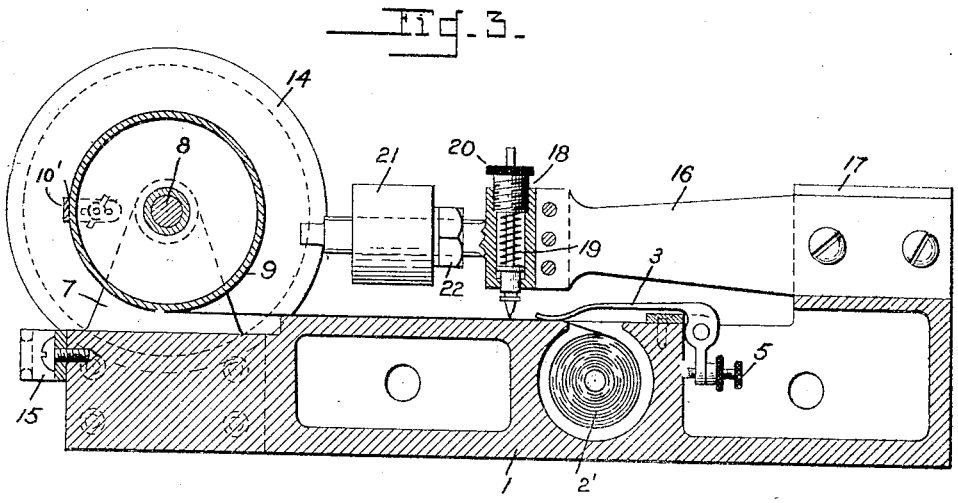
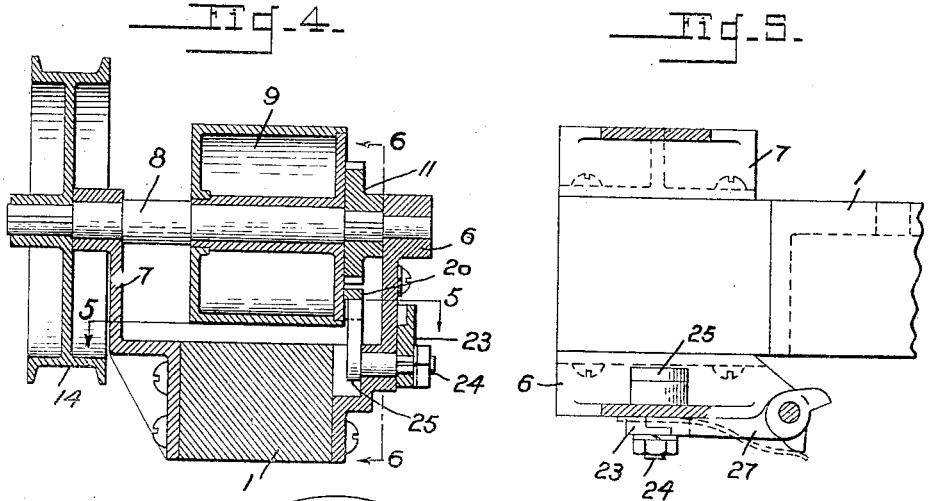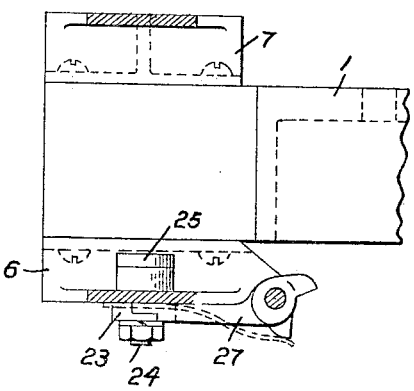
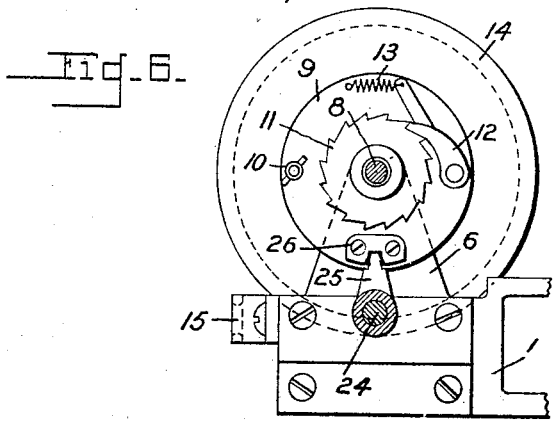
INVENTOR
W. C. Palmer
BY
W. N. Roach.
ATTORNEY Patented Mar. 8, 1927.

1,620,224

UNITED STATES PATENT OFFICE.

WILLIAM C. PALMER, OF DAVENPORT, IOWA.

VELOCIMETER.

Application filed April 14, 1923. Serial No. 632,121.

(GRANTED UNDER THE ACT OF MARCH 3, 1883; 22 STAT. L. 625.)

The invention described herein may be used by the Government, or any of its officers or employees in prosecution of work for the Government, or by any other person in the United States, without payment to me of any royalty thereon, in accordance with the act of March 3, 1883.

The subject of this invention is a velocimeter intended for recording the velocity of a moving element and particularly the recoil and recuperator mechanism of a gun.

In the present invention I accomplish the object sought by recording the vibrations of a vibratory element of a predetermined beat upon a record element moving with a fixed ratio with respect to the movement of the element, the movement of which is to be measured.

From the foregoing it is evident that, knowing the ratio between the movement of the record strip and the moving element and the rate of beat of the vibrating element, by measuring the distance between the crests of the waves of vibration, the time it took the record element to pass through that distance is known; from which it is a simple matter to calculate the distance passed through by the moving element during the same space of time.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Fig. 1 is a plan view of a velocimeter constructed in accordance with my invention, the vibratory element released, and shown in tensioned position in dotted lines;

Fig. 2 is a side elevation;

Fig. 3 is a central longitudinal section;

Fig. 4 is a transverse section through the drum and pulley;

Fig. 5 is a section taken on the line 5—5 of Fig. 4;

Fig. 6 is a section on the line 6—6 of Fig. 4.

Fig. 7 is a more or less diagrammatic view showing the application of my improved velocimeter to a gun.

Referring to the drawings by numerals of reference;

In carrying out my invention I prefer to provide a base 1 formed with a compartment 2 for the reception of a record strip roll 2', which strip is led from said compartment under a spring 3 pivoted in a bracket 4 and fitted with an adjusting screw 5 by means of which the tension of the spring upon the record strip may be varied.

From one end of the base arise brackets 6 and 7 in which is journaled a shaft 8 having a drum 9 loosely mounted thereon on which the record strip is adapted to be wound, the strip being held to the drum by any suitable clamping bar 10' held in place by the wing nut 10. Secured on the shaft adjacent one head of the drum is a ratchet wheel 11 engaged by a pawl 12 which is mounted on the drum and held in engagement with the ratchet wheel, conveniently by means of a spring 13. Secured to the shaft is a pulley 14 about which a cord, 14', may be given a few turns both ends of the cord being attached to the moving element the velocity of movement of which is to be measured, the cord being led from the pulley in opposite directions so that oscillation of the moving element will cause oscillation of the pulley. A guide 15 may be attached to the base adjacent the pulley for the purpose of properly guiding the cord.

From the foregoing it will be seen that as the pulley rotates counterclockwise, as viewed in Fig. 6, the pawl will ride over the ratchet wheel and no movement of the drum will be had. When, however, the pulley moves in opposite direction, or clockwise, the teeth of the ratchet wheel will come into engagement with the pawl thereby causing rotation of the drum with the pulley.

In order that a wave of predetermined amplitude may be recorded on the strip I prefer to provide a resilient arm 16 which is suitably attached to an upwardly projecting portion of the base, and which is provided, adjacent its free end, with a marker or pencil holder 18 provided with suitable means, herein shown as a coiled spring 19 and adjusting nut 20, for holding the marker or pencil firmly against the strip. In order that the amplitude of vibration of the resilient arm may be regulated to a predetermined amount, a weight 21 is mounted for adjustment on the end of the arm, the method of adjustment herein shown consisting in threading the weight on the end of the arm and locking it in adjusted position by a jam nut 22.

To place the arm in tension so that the same may vibrate at the proper time to inscribe a record on the strip, I provide suitable means for holding the arm in tension until the start of rotation of the drum, such means, as herein shown by way of illustration, consisting of a sear 23 mounted on shaft 24 journaled in the base and having secured thereon a projection or trip 25 which normally engages a trip plate 26 which is secured to one head of the drum.

A trigger 27 is pivotally mounted on the base and one end is adapted for engagement with the end of the vibratory arm while the other end is formed for engagement with the sear and, when such engagement is had, the trigger holds the vibratory arm in tension in the position shown most clearly in dotted lines in Fig. 1.

It will now be evident that when the pulley moves in a clockwise direction as viewed in Fig. 6 the drum will be rotated winding the record strip thereon and, upon start of such rotation, the trip plate will throw the trip rocking the shaft 24 and releasing the sear 23 from engagement with the trigger 27 which will immediately cause release of the resilient arm or vibratory element 16 which will then start vibrating at a predetermined rate causing waves of a predetermined amplitude to be marked upon the record strip.

I claim:

1. A velocimeter, embodying a base formed with a receptacle for a record strip roll, a tension spring secured to the base adjacent the receptacle, a vibratory member carried by the base, a marker attached to the member to contact with the record strip, means for adjusting the period of vibration of the member, a shaft journaled on the base, a pulley rigid on the shaft for reception of a cord, a guide adjacent the pulley, a drum loose on the shaft, means for attaching the record strip to the drum, a ratchet rigid on the shaft and adjacent the drum, a pawl on the drum to contact with the ratchet when the shaft is rotated in one direction and rotate the drum therewith, a sear mounted on the base, a sear trip plate carried by the drum and a trigger normally engaged by the sear and in engagement with the vibratory member to hold the member in tension and to release the same when the drum starts to rotate.

2. A velocimeter, embodying a base formed with a receptacle for a record strip roll, a vibratory member attached to the base, a marker carried by the member in position to contact with the record strip, a shaft journaled on the base, a pulley fast on the shaft, a drum loose on the shaft, means carried by the drum for securing the record strip thereto, means carried by the shaft and drum cooperating to rotate the drum with the shaft in one direction, a sear, a sear trip plate carried by the drum and a trigger connected to the base and normally held by the sear to hold the vibratory member in tension and to release the same when the sear is rocked by initial rotation of the drum.

3. A velocimeter embodying a base formed with a receptacle for a record strip roll, a vibratory member attached to the base, means for regulating the period of vibration of said member, a marker carried by the member in position to contact with the strip, a shaft mounted on the base, a pulley secured to the shaft, a drum loose on the shaft, means carried by the shaft and drum cooperating to rotate the drum with the shaft in one direction to move the record strip and means normally retaining the vibratory member in tension, said means being released by initial rotation of the drum.

4. A velocimeter embodying a base formed with a receptacle for a record strip roll, a vibratory member attached to the base, means for regulating the period of vibration of the member, a marker carried by the member in position to engage the record strip, an element adapted to be rotated by movement of the object, the velocity of which is to be measured, a record strip carrying element adapted to rotate with the first mentioned element in only one direction and means normally holding the vibratory member under tension automatically released by initial rotation of the strip carrying element.

5. A velocimeter embodying a record strip movable at a predetermined velocity ratio with respect to an object, the velocity of whose movement is to be measured and a vibratory member of a predetermined beat whose vibrations are recorded on the strip and means controlled by initial movement of the strip for releasing said vibratory member.

6. A velocimeter embodying a record strip movable at a predetermined velocity ratio with respect to an object, the velocity of whose movement is to be measured and a vibratory member adjustable to a predetermined beat whose vibrations are recorded on the strip.

WILLIAM C. PALMER.